United States Patent
Cho et al.

(10) Patent No.: US 7,327,410 B2
(45) Date of Patent: Feb. 5, 2008

(54) HIGH RESOLUTION 3-D IMAGE DISPLAY WITH LIQUID CRYSTAL SHUTTER ARRAY

(75) Inventors: Kun-ho Cho, Suwon-si (KR); Dao-sik Kim, Suwon-si (KR); Sung-ha Kim, Suwon-si (KR); Hee-joong Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 10/901,301

(22) Filed: Jul. 29, 2004

(65) Prior Publication Data

US 2005/0057702 A1    Mar. 17, 2005

(30) Foreign Application Priority Data

Jul. 29, 2003    (KR) .................. 10-2003-0052460

(51) Int. Cl.
*G02F 1/1335* (2006.01)

(52) U.S. Cl. .............................. 349/15; 356/12; 353/6; 353/7; 359/462; 359/466; 359/467; 359/468

(58) Field of Classification Search .................. 349/15; 356/12; 348/51; 353/617; 359/462, 466, 359/467, 468
See application file for complete search history.

(56) References Cited

U.S. PATENT DOCUMENTS

| | | | |
|---|---|---|---|
| 5,751,479 A | | 5/1998 | Hamagashi et al. |
| 6,040,807 A | * | 3/2000 | Hamagishi et al. ............ 345/6 |
| 6,094,216 A | | 7/2000 | Taniguchi et al. |
| 6,115,101 A | * | 9/2000 | Kainen ......................... 355/22 |
| 6,856,341 B2 | * | 2/2005 | Suzuki .......................... 348/51 |
| 7,016,116 B2 | * | 3/2006 | Dolgoff ....................... 359/630 |

FOREIGN PATENT DOCUMENTS

| | | |
|---|---|---|
| JP | 08-201726 A | 8/1996 |
| JP | 10-142572 A | 5/1998 |
| JP | 2000-275576 A | 10/2000 |
| KR | 1999-0053446 A | 7/1999 |
| KR | 2003-0021293 A | 3/2003 |

\* cited by examiner

*Primary Examiner*—Huyen Ngo
(74) *Attorney, Agent, or Firm*—Sughrue Mion, Pllc.

(57) ABSTRACT

A 3-D image display comprising a backlight, a liquid crystal shutter array having an opening and a mask alternately formed therein and selectively passing light emitted from the backlight by switching the opening and the mask. A display device having left eye image information and right eye image information at a plurality of viewpoints, in which the left eye image information and the right eye image information are changed along the movement of the opening. An image according to the left eye image information and the right eye image information of a plurality of viewpoints is sequentially displayed through the opening.

13 Claims, 5 Drawing Sheets

LEFT EYE IMAGE          RIGHT EYE IMAGE

HIGH RESOLUTION 3-D IMAGE DISPLAY WITH LIQUID CRYSTAL SHUTTER ARRAY

CROSS-REFERENCE TO RELATED APPLICATIONS

This application claims the priority of Korean Patent Application No. 2003-52460, filed on Jul. 29, 2003, in the Korean Intellectual Property Office, the disclosure of which is incorporated herein in its entirety by reference.

BACKGROUND OF THE INVENTION

1. Field of the Invention

The present invention relates to a 3-D image display, and more particularly, to a 3-D image display which improves a resolution by sequentially moving images of a plurality of viewpoints and selectively displaying the images.

2. Description of the Related Art

In general, a 3-D image is made by the principle of stereo vision through the eyes of a human. Binocular parallax occurring due to the eyes separated about 65 mm from each other can be considered the most important factor in producing a 3-D effect. There is a display using glasses or a display without using glasses in 3-D image displays. The display without using glasses obtains a 3-D image by separating left and right images without using glasses. There is a parallax barrier type and a lenticular type as the non-glasses type.

In the parallax barrier type, images to be seen by both left and right eyes are printed or photographed in an alternate vertical pattern and the pattern is seen by using a very thin vertical lattice, that is, a barrier. By doing so, a vertical pattern image to be seen by the left eye and a vertical pattern image to be seen by the right eye are separated by the barrier, and the left and right eyes see images at different viewpoints so as to see a 3-D image.

According to the parallax barrier type, as shown in FIG. 1A, a parallax barrier 10 having a vertical lattice shape and an opening 5 and a mask 7 is arranged in front of an LCD panel 3 having left eye image information L and a right eye image information R corresponding to a left eye LE and a right eye RE of an observer, respectively. An image is separated by the opening 5 of the parallax barrier 10. In the LCD panel 3, the image information L to be input to the left eye LE and the image information R to be input to the right eye RE are alternately arranged along a horizontal direction.

A pixel having the left eye image information L and a pixel having a right eye image information R form a set. The left and right pixels with respect to the opening 5 are pixels of different viewpoints so that a 3-D image is realized. For example, a first left eye image is input to the left eye LE and a first right eye image is input to a right eye RE. A second left eye image is input to the left eye LE and a second right eye image is input to the right eye. The left and right pixels input to the corresponding left and right eyes in the same method.

In the above method, since an image is formed by the opening 5 and the image is blocked by the mask 7, as shown in FIG. 1B, for example, the left eye image L is formed only on the even-numbered line while the odd-numbered line is blocked by the mask 7, so that a black line K is formed. Also, the right eye image R is formed only on the odd-numbered line while the even-numbered line is blocked by the mask 7, so that a black line K is formed.

Thus, a resolution of a display is lowered as a whole and brightness of a 3-D image is lowered.

SUMMARY OF THE INVENTION

To solve the above and/or other problems, the present invention provides a 3-D image display having an improved resolution by including image information of a plurality of viewpoints and displaying all images of a plurality of viewpoints while moving the opening and the mask.

According to an aspect of the present invention, a 3-D image display comprises a backlight, a liquid crystal shutter array having an opening and a mask alternately formed therein and selectively passing light emitted from the backlight by switching the opening and the mask, and a display device having left eye image information and right eye image information at a plurality of viewpoints, in which the left eye image information and the right eye image information are changed along the movement of the opening, wherein an image according to the left eye image information and the right eye image information of a plurality of viewpoints is sequentially displayed through the opening.

According to another aspect of the present invention, a 3-D image display comprises a light source array having an opening where light is emitted and a mask where light is not emitted, in which the opening and the mask are alternately formed therein and selectively switched, and a display device having left eye image information and right eye image information at a plurality of viewpoints, in which the left eye image information and the right eye image information are changed along the movement of the opening, wherein an image according to the left eye image information and the right eye image information of a plurality of viewpoints is sequentially displayed through the opening.

The image information has image information at the same viewpoint in a vertical direction and image information at a different viewpoint in a horizontal direction.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1A:
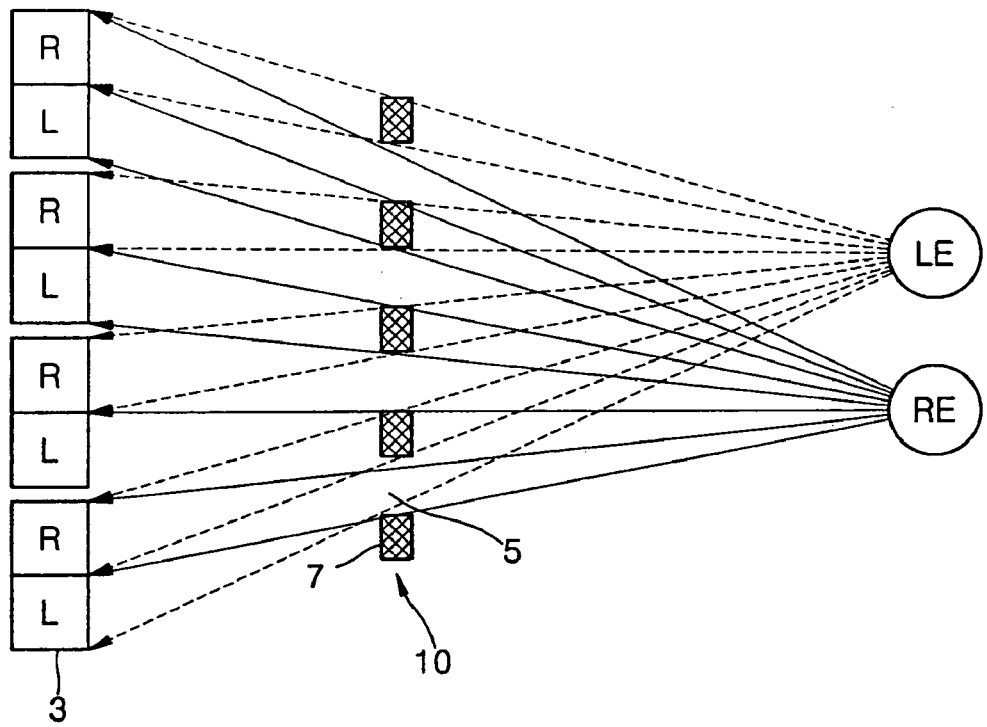
FIG. 1A is a view illustrating a conventional 3-D image display in a parallax barrier method.
Figure 1B:
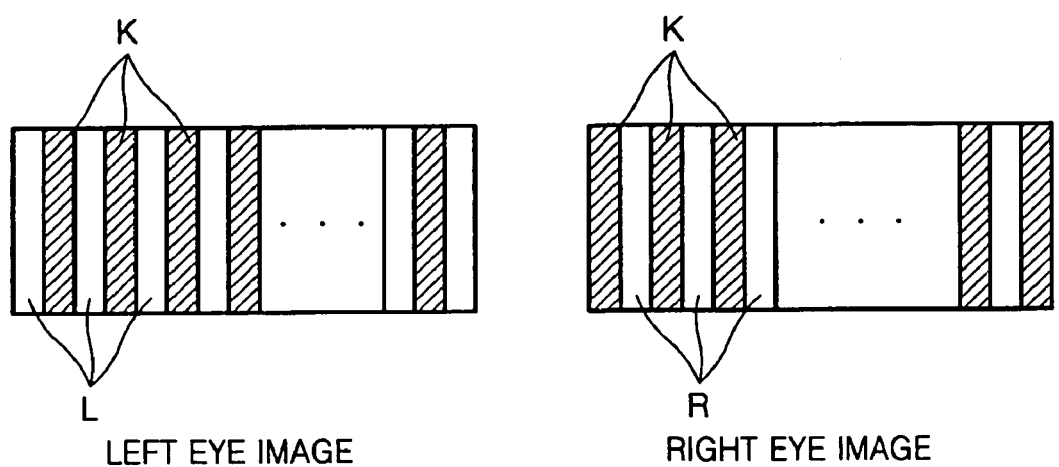
FIG. 1B is a view illustrating a state in which the left eye image and the right eye image according to the conventional parallax barrier method are displayed.
Figure 2A:
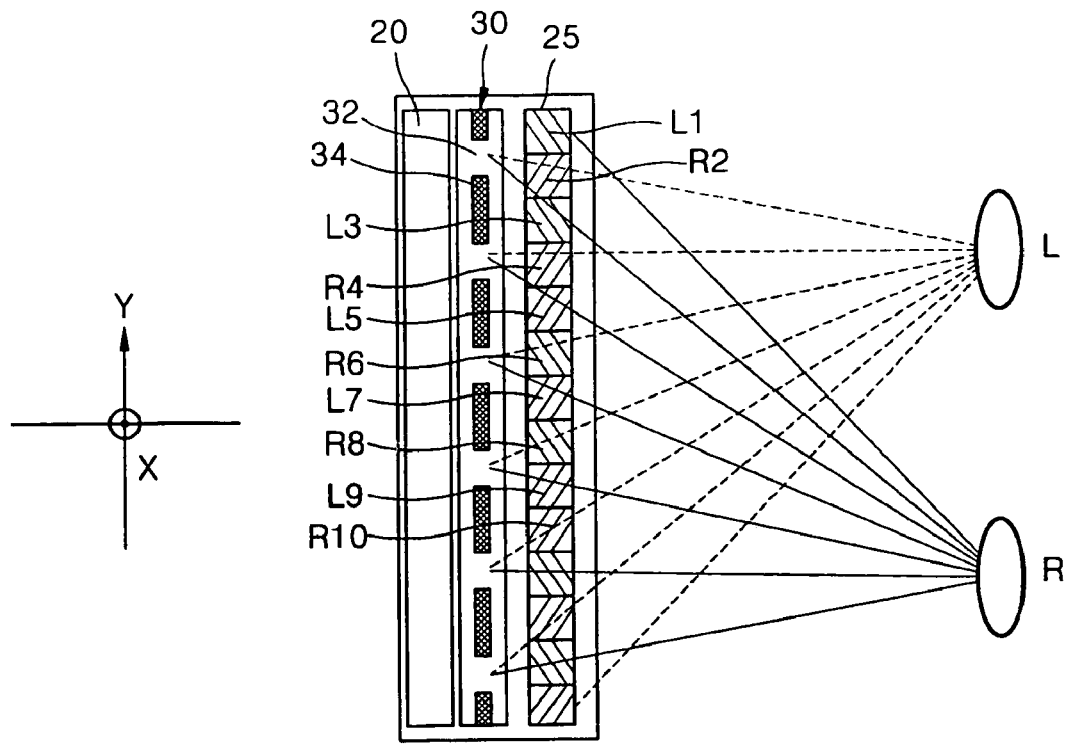
FIGS. 2A and 2B are views illustrating a 3-D image display according to a first preferred embodiment of the present invention.

Referring to FIG. 2A, a 3-D image display according to a first preferred embodiment of the present invention includes a backlight 20, a display device 25, and a liquid crystal shutter array 30.

The liquid crystal shutter array 20 selectively applies power to areas in which an opening 32 and a mask 34 are alternately arranged and periodically switched. The display device 25, for example, is a transmission LCD panel.

Figure 2B:
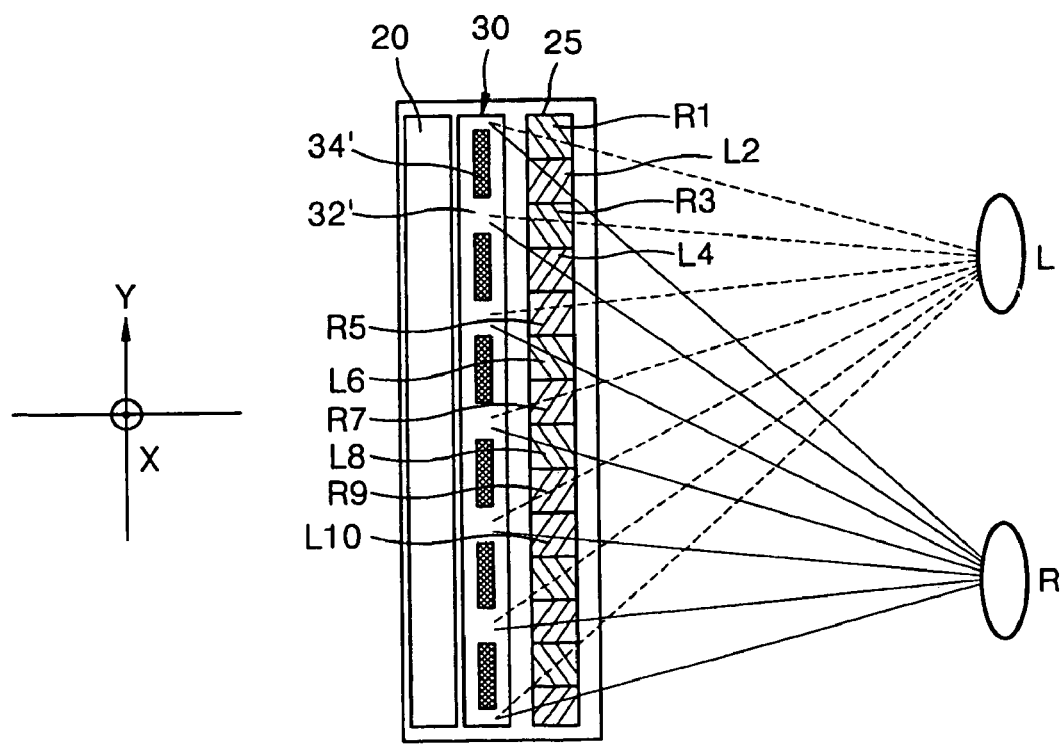

The process of forming a left eye image and a right eye image by a switching operation of the liquid crystal shutter array 30 is illustrated in FIGS. 2A and 2B. The display device 25 has left eye image information and right eye image information. Also, each of the left eye image information and the right eye image information includes image information according to a plurality of viewpoints. For example, the left eye image information and the right eye image information may include two pieces of image information having different viewpoints as image information of a frame.

In this case, the left eye image information and the right eye image information include odd-numbered image information and even-numbered image information, respectively. Light emitted from the backlight 20 passes through the opening 32 to form an image according to the image information of the display device 25. The mask 34 blocks the light emitted from the backlight 20 so that an image is not formed. Thus, when an image is formed through the liquid crystal shutter array 30, a line forming an image through the opening 32 and a line blocking the image by the mask 34 are alternately formed.

When the line forming the image is assumed to be an odd-numbered line, the image is referred to as an odd-numbered image. When the line forming the image is assumed to be an even-numbered line, the image is referred to as an even-numbered image.

An odd-numbered left eye image is represented as L1, L3, L5, . . . , L(2n−1) wherein "n" is a natural number. An even-numbered left eye image is represented as L2, L4, L6, . . . , L(2n) wherein "n" is a natural number. Also, an odd-numbered right eye image is represented as R1, R3, R5, . . . , R(2n−1) wherein "n" is a natural number. An even-numbered right eye image is represented as R2, R4, R6, . . . , R(2n) wherein "n" is a natural number.

Referring to FIG. 2A, the liquid crystal shutter array 30 includes a first opening 32 and a first mask 34 when t=t1. For example, the odd-numbered left eye images L1, L3, L5, L7, and L9 and the even-numbered right eye images R2, R4, R6, R8, and R10 are formed on the left and right eyes L and R, respectively, through the first opening 32.

Next, referring to FIG. 2B, the opening and the mask are switched by the switching operation of the liquid crystal shutter array 30. That is, the opening is switched to the mask while the mask is switched to the opening. The switched opening and the switched mask are referred to as a second opening 32' and a second mask 34', respectively.

Simultaneously with the switching operation of the liquid crystal shutter array 30, the image information of the display device 25 is moved. Thus, as shown in FIG. 2B, the even-numbered left eye images L2, L4, L6, L8, and L10 and the odd-numbered right eye images R1, R3, R5, R7, and R9 are formed.

Figure 3A:
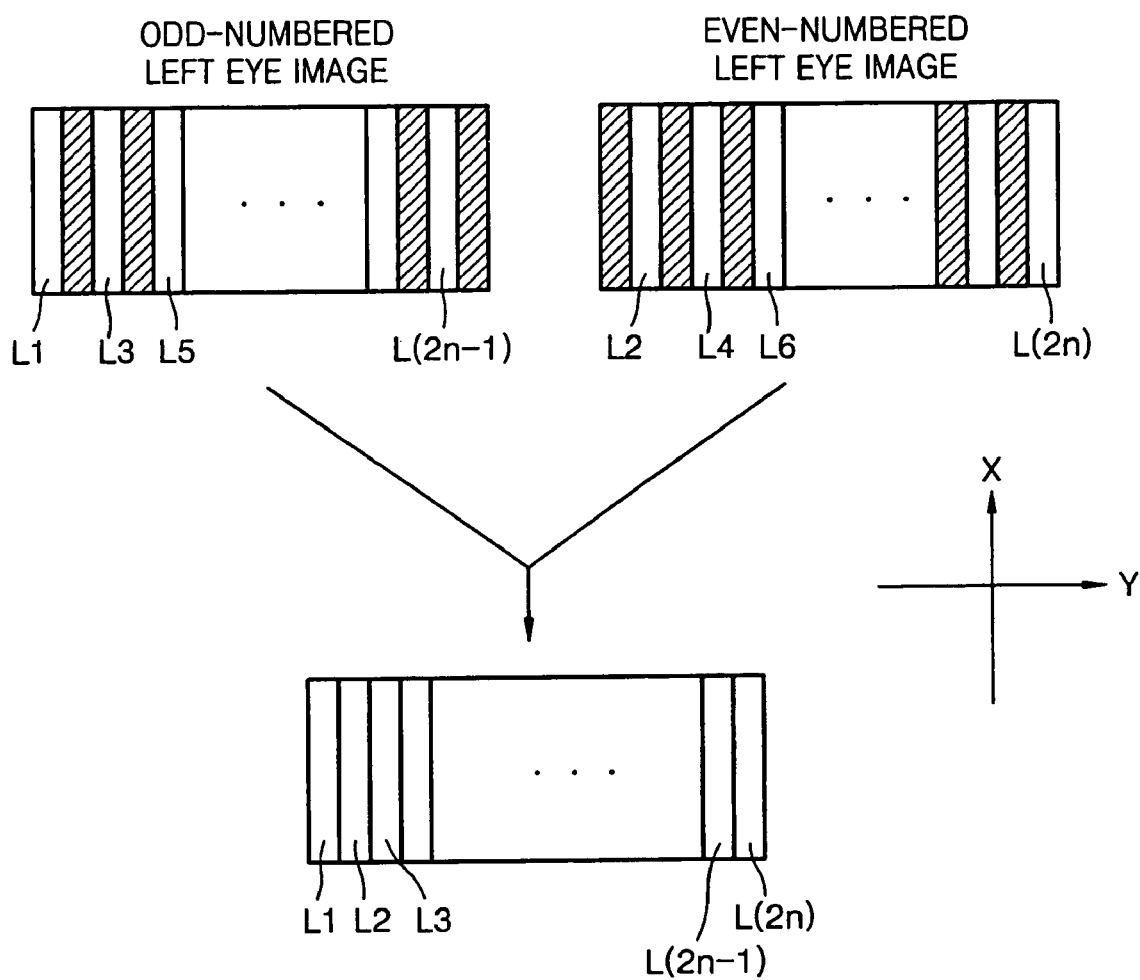
FIGS. 3A and 3B are views illustrating the process of displaying a left eye image and a right eye image according to the 3-D image display shown in FIGS. 2A and 2B.

FIG. 3A shows the odd-numbered left eye images L1, L3, L5, . . . , L(2n−1) and the even-numbered left eye images L2, L4, L6, . . . , L(2n). A left eye image of a frame is formed by combining the odd-numbered left eye image and the even-numbered left eye image.

Figure 3B:
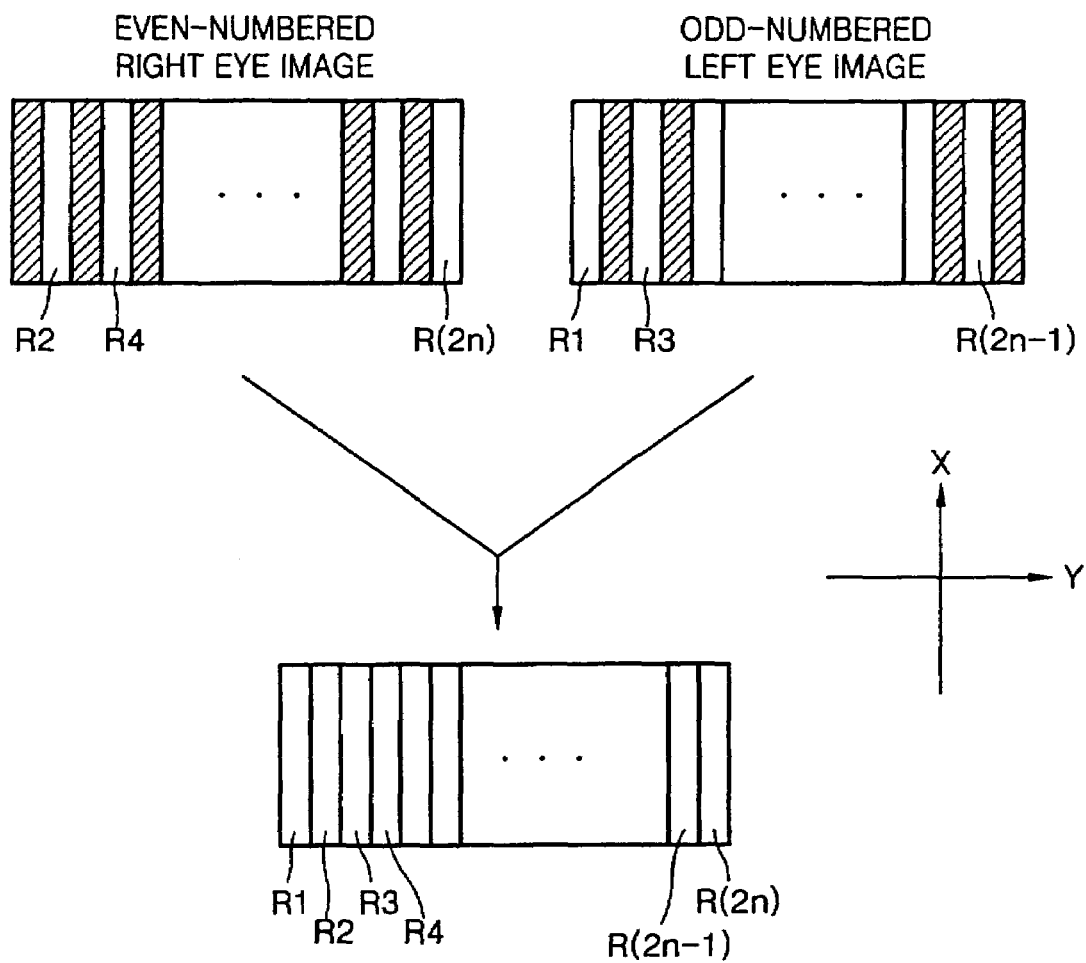

FIG. 3B shows the even-numbered right eye images R1, R3, R5, . . . , R(2n) and the odd-numbered right eye images R2, R4, R6, . . . , R(2n−1). A right eye image of a frame is formed by combining the even-numbered right eye image and the odd-numbered right eye image.

As described above, the resolution of the 3-D image display according to the present invention is improved since an image at a plurality of viewpoints is provided while an aperture area scans the entire area of the liquid crystal shutter array. In the above description, an image of a frame is formed by a set of the left eye image and the right eye image which correspond the odd-numbered image and the even-numbered image, respectively. Alternatively, an image of a frame may be formed by an image formed of three or more viewpoints. The image at a plurality of viewpoints is sequentially moved by using the liquid crystal shutter array. The image signals corresponding to the images at a plurality of viewpoints are sequentially moved.

In other words, while the image information of a plurality of viewpoints is sequentially and periodically moved in a horizontal direction (Y direction), the images are selectively sampled using the liquid crystal shutter array 30. Thus, a 3-D image at a plurality of viewpoints can be obtained. Referring to FIGS. 3A and 3B, the image at a plurality of viewpoints has image information of the same viewpoint in the vertical direction (X direction) and different viewpoints in the horizontal direction (Y direction).

Thus, as the entire area of a screen is scanned by periodically moving the image of a plurality of viewpoints, resolution is improved and a viewing angle of a viewer is increased.

The display device 25 and the liquid crystal shutter array 30 can be arranged by switching the positions thereof.

Figure 4A:
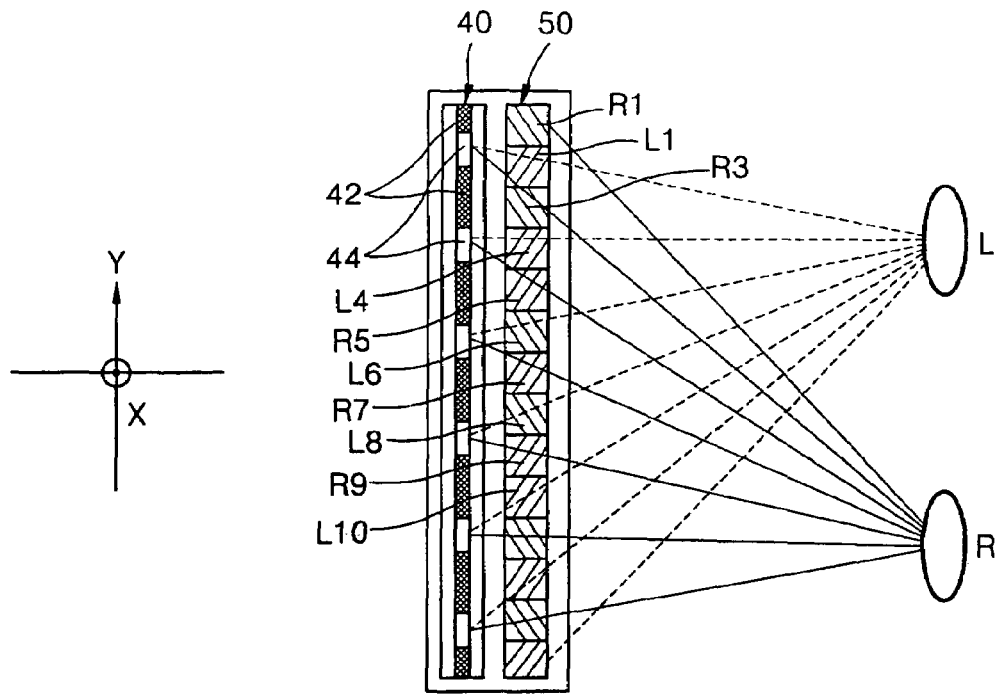
FIGS. 4A and 4B are views illustrating a 3-D image display according to a second preferred embodiment of the present invention.
Figure 4B:
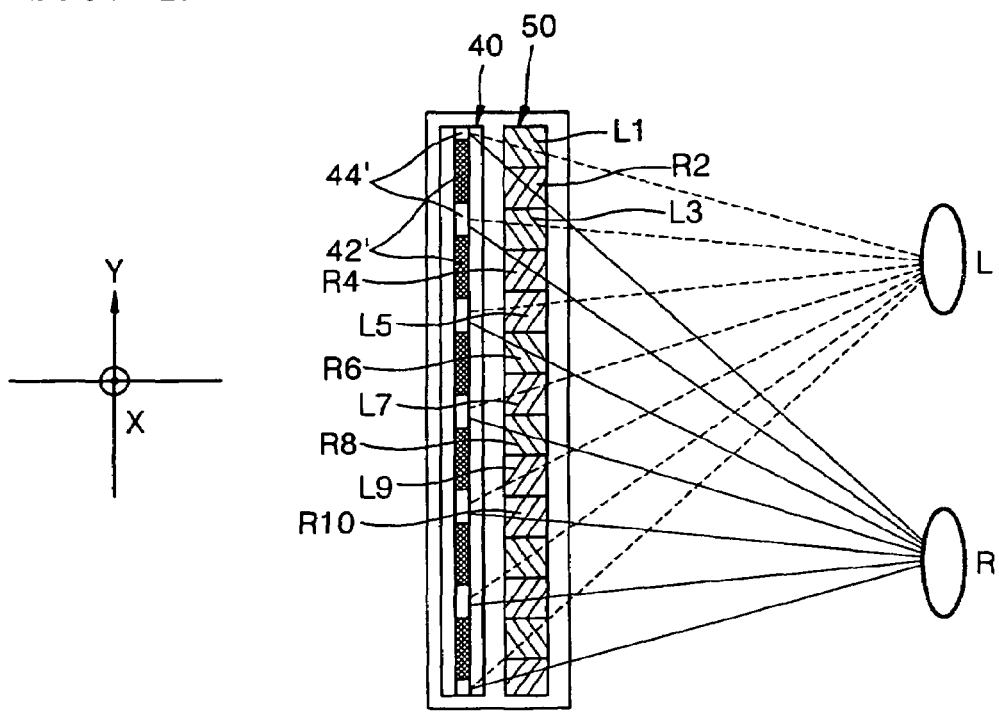

Next, referring to FIGS. 4A and 4B, a 3-D image display according to a second preferred embodiment of the present invention includes a light source array 40 and a display device 50.

The light source array 40 may be, for example, a PDP or an organic EL. Preferably, the light source array 40 can selectively form a light emitting area having a long slit shape in the vertical direction (X direction).

In the light source array 40, an opening 44 and a mask 42 are alternately arranged along the horizontal direction (Y direction) which are controlled to be turned on or off. The opening 44 is an area where light is emitted and the mask 42 is an area where light is not emitted.

The opening 44 and the mask 42 have widths corresponding to a pixel unit of the display device 50 and are selectively switched by the on-off control of the light source array 40. For the opening 44, the light source array 40 is in an ON state in the vertical direction (X direction). For the mask 42, the light source array 40 is in an OFF state in the vertical direction (X direction).

As the light emitted from the opening 44 passes through the display device 50, the left eye image and the right eye image are formed according to an image signal of the display device 50.

The widths of the opening 44 and the mask 42 may be changed according to the pitch of a pixel of the display device 50 and the number of images according to the viewpoints included in an image of a frame. For example, an image of a frame may include an image at two viewpoints or an image at three or more viewpoints. The widths of the opening and the mask can be adjusted according to the image of a plurality of viewpoints.

The display device 50 includes left eye image information and right eye image information. The left eye image information and the right eye image information may include image information according to a plurality of viewpoints with respect to the image information of a frame. For example, the left eye image information can include odd-numbered image information L1, L3, . . . , L(2n−1) and even-numbered image information L2, L4, . . . , L(2n). Also, the right eye image information includes odd-numbered image information R1, R3, . . . , R(2n−1) and even-numbered image information R2, R4, . . . , R(2n). The odd-numbered right eye image and the even-numbered left eye image, neighboring each other, are combined to form an image of a frame.

For example, referring to FIG. 4A, when t=t1 and the first opening 44 and the first mask 42 are alternately formed, odd-numbered right eye images R1, R3, ..., R9 and even-numbered left eye image L2, L4, ..., L10 are formed through the first opening 42. Next, the first opening 44 and the first mask 4424 are changed to a second mask 42' and a second opening 44', respectively, by the switching operation of the light source array 40 when t=t2. Image information is moved together with the changing of the opening and the mask. By doing so, as shown in FIG. 4B, even-numbered right eye images R2, R4, ..., R10 and odd-numbered left eye image L1, L3, ..., L9 are formed through the second opening 44'.

A left eye image of a frame is formed by combining an even-numbered left eye image when t=t1 and an odd-numbered left eye image when t=t2. A right eye image of a frame is formed by combining an odd-numbered right eye image when t=t1 and an even-numbered right eye image when t=t2.

In the present invention, resolution is improved by scanning an image at a plurality of viewpoints onto the left and right eyes. Also, if there is a large amount of image information according to the viewpoints, a large range of vision of a viewer can be obtained.

As described above, the 3-D image display according to the present invention includes the image information of a plurality of viewpoints for the left eye and the image information of a plurality of viewpoints for the right eye. As images corresponding to the image information are sequentially scanned so that resolution is improved and a viewing angle of a viewer increases.

What is claimed is:

1. A 3-D image display comprising:
    a backlight;
    a liquid crystal shutter array having an opening and a mask alternately formed therein and selectively passing light emitted from the backlight by switching the opening and the mask periodically; and
    a display device having left eye image information and right eye image information at a plurality of viewpoints, in which the left eye image information and the right eye image information are changed in accordance with a switching period of the opening and the mask,
    wherein images according to the left eye image information and the right eye image information of the plurality of viewpoints are sequentially displayed though the opening, and
    wherein a left eye image of a frame is formed by combining left eye images which are sequentially displayed and a right eye image of the frame is formed by combining right eye images which are sequentially displayed.

2. The 3-D image display as claimed in claim 1, wherein the opening comprises a plurality of continuous long list extending in a vertical direction.

3. The 3-D image display as claimed in claim 1, wherein the image information has image information at the same viewpoint in a vertical direction and image information at a different viewpoint in a horizontal direction.

4. The 3-D image display as claimed in claim 1, wherein a left eye image and a right eye image are formed by a switching operation of the liquid crystal shutter array, which switches the opening and the mask.

5. The 3-D image display as claimed in claim 4, wherein the switching operation is a shutter operation.

6. The 3-D image display as claimed in claim 1, wherein the opening is switched to the mask, while the mask is switched to the opening.

7. The 3-D image display as claimed in claim 1, wherein the entire area of the liquid crystal shutter array is scanned by the sequential movement of the opening.

8. A method for displaying a 3-D image comprising the steps of:
    selectively passing light emitted from a backlight by switching an opening and mask of a liquid crystal shutter periodically; and
    changing left eye image information and right eye image information in accordance with a switching period of the opening and mask to sequentially display the 3-D image;
    wherein said left eye image information and right eye image information have information regarding a plurality of viewpoints, and
    wherein a left eye image of a frame is formed by combining left eye images which are sequentially displayed and a right eye image of the frame is formed by combining right eye images which are sequentially displayed.

9. The method for displaying a 3-D image of claim 8, wherein the opening comprises a plurality of continuous long list extending in a vertical direction.

10. The method for displaying a 3-D image of claim 8, wherein the image information has image information at the same viewpoint in a vertical direction and image information at a different viewpoint in a horizontal direction.

11. The method for displaying a 3-D image of claim 8, further comprising performing a switching operation, wherein the opening and the mask of the liquid crystal shutter array are switched.

12. The method for displaying a 3-D image of claim 11, wherein the switching operation is a shutter operation.

13. The method for displaying a 3-D image of claim 8, wherein the opening is switched to the mask, while the mask is switched to the opening.

* * * * *